US011585943B2

United States Patent
Lyusin (10) Patent No.: US 11,585,943 B2
(45) Date of Patent: *Feb. 21, 2023

(54) DETECTION AND ELIMINATION OF GNSS SPOOFING SIGNALS WITH PVT SOLUTION ESTIMATION

(71) Applicant: Magellan Systems Japan, Inc., Hyogo (JP)

(72) Inventor: Sergey Lyusin, Moscow (RU)

(73) Assignee: Magellan Systems Japan, Inc., Amagasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,702

(22) Filed: Feb. 1, 2021

(65) Prior Publication Data
US 2021/0157013 A1    May 27, 2021

Related U.S. Application Data

(63) Continuation-in-part of application No. 16/233,665, filed on Dec. 27, 2018, now Pat. No. 10,908,294, (Continued)

(51) Int. Cl.
*G01S 19/21* (2010.01)
(52) U.S. Cl.
CPC .................. *G01S 19/215* (2013.01)
(58) Field of Classification Search
CPC .................................................. G01S 19/215
See application file for complete search history.

(56) References Cited

U.S. PATENT DOCUMENTS 6,466,958 B1   10/2002   Van Wechel
6,639,549 B2   10/2003   Vanderwerf
(Continued)

FOREIGN PATENT DOCUMENTS

WO   2016/067279   5/2016

OTHER PUBLICATIONS

Kaplan, Elliott D. et al., "Understanding GPS Principles and Applications", Second Edition, p. 550, 2006 (Year: 2006).
(Continued)

*Primary Examiner* — Cassi J Galt
(74) *Attorney, Agent, or Firm* — Beyer Law Group LLP (57) ABSTRACT

A GNSS spoofing signal detection/elimination includes tracking acquired candidate GNSS signals for each target GNSS signal, identifying the acquired candidate GNSS signals as authentic, unauthenticated, or counterfeit, removing the counterfeit GNSS signal(s) from tracking, generating a first list of the authentic GNSS signals and a second list of unauthenticated candidate GNSS signals, creating a plurality of sets of GNSS signals by selecting at least four GNSS signals from among the first list and the second list, such that each set includes all of the authentic GNSS signals, if any, and at least one unauthenticated candidate GNSS signal such that each set includes only one candidate signal per target GNSS signal, calculating PVT solutions and post-fit residuals for each set, thereby obtaining a plurality of estimated solutions, estimating authenticity of unauthenticated GNSS signals by analyzing the plurality of estimated solutions.

12 Claims, 8 Drawing Sheets

Related U.S. Application Data which is a continuation of application No. PCT/IB2017/058091, filed on Dec. 19, 2017.

(60) Provisional application No. 62/436,323, filed on Dec. 19, 2016.

(56) References Cited

U.S. PATENT DOCUMENTS

| | | | |
|---|---|---|---|
| 7,248,964 | B2 | 7/2007 | Bye |
| 7,764,224 | B1 | 7/2010 | Anderson |
| 10,018,730 | B2 | 7/2018 | Youssef |
| 11,099,276 | B2* | 8/2021 | Lentz ..................... G01S 19/33 |
| 2015/0145724 | A1 | 5/2015 | Kana et al. |
| 2016/0178752 | A1 | 6/2016 | Davies |
| 2016/0370471 | A1 | 12/2016 | Mabuchi et al. |
| 2017/0336517 | A1 | 11/2017 | Petillon |
| 2019/0129041 | A1 | 5/2019 | Lyusin |

OTHER PUBLICATIONS

Gunther, Christoph "A Survey of Spoofing and Counter-Measures" Journal of the Institute of Navigation, vol. 61., No. 3, p. 159-177, Apr. 2014.
Scott, Logan, "Anti-Spoofing & Authenticated Signal Architectures for Civil Navigation Systems" Proceedings ofIon GPS/GNSS, vol. 2003, p. 1543-1552, Jan. 2003.
International Search Report from International Application No. PCT/IB2017/058091 dated Apr. 20, 2018.
Written Opinion from International Application No. PCT/IB2017/058091 dated Apr. 20, 2018.
Office Action dated Dec. 27, 2019, U.S. Appl. No. 16/233,665.
Notice of Allowance, dated Sep. 24, 2020, U.S. Appl. No. 16/233,665.

* cited by examiner

FIG. 1

| Signal | Notation | Signal Frequency Range, MHz |
|---|---|---|
| GLONASS L1 | G1 | 1593 ~ 1610 |
| BeiDou B1-2 | B1-2 | 1580 ~ 1600 |
| GPS L1, Galileo E1, QZSS L1 | L1 | 1563 ~ 1587 |
| BeiDou B1 | B1 | 1551 ~ 1571 |
| Galileo E6, QZSS LEX | E6 | 1259 ~ 1299 |
| BeiDou B3 | B3 | 1259 ~ 1279 |
| GLONASS L2 | G2 | 1238 ~ 1254 |
| GPS L2, QZSS L2 | L2 | 1218 ~ 1238 |
| BeiDou B2 | B2 | 1197 ~ 1217 |
| GLONASS L3 | G3 | 1191 ~ 1211 |
| Galileo E5 | E5 | 1167 ~ 1217 |
| GPS L5, QZSS L5 | L5 | 1164 ~ 1188 |

# DETECTION AND ELIMINATION OF GNSS SPOOFING SIGNALS WITH PVT SOLUTION ESTIMATION

CLAIM OF PRIORITY

This application is a Continuation-in-Part of application Ser. No. 16/233,665 filed on Dec. 27, 2018, which is a continuation of International Application No. PCT/IB2017/058091 filed on Dec. 19, 2017, which claims priority to U.S. Provisional Patent Application No. 62/436,323, filed on Dec. 19, 2016, all of which are hereby incorporated by reference.

BACKGROUND OF THE INVENTION

1. Field of the Invention

The present invention relates to GNSS receivers and GNSS signal processing. More specifically, the present invention relates to detection and elimination of GNSS spoofing signals and estimation of PVT (position, velocity, and time) solutions at a GNSS receiver.

2. Description of the Related Art

Global Navigation Satellite Systems (GNSS) available today include United States Global Positioning System (GPS), Russian Global Orbiting Navigation Satellite System (GLONASS), European Union's Galileo, China's regional BeiDou Satellite Navigation System (BDS, formerly known as Compass), and Japanese Quasi-Zenith Satellite System (QZSS).

A GNSS spoofing signal is a type of structured interference that is close enough to a GNSS specification so as to appear authentic to an unsuspecting GNSS receiver. An intentional spoofer deliberately attempts to manipulate the PVT (position, velocity, and time) readout of a target GNSS receiver. For example, a GNSS spoofing attack may try to deceive a GNSS receiver by broadcasting incorrect GNSS signals, structured to resemble a set of normal GNSS signals, or by rebroadcasting genuine GNSS signals captured elsewhere or at a different time. These spoofed signals may be modified in such a way as to cause the GNSS receiver to estimate its position to be somewhere other than where it actually is, or to be located where it is but at a different time, as determined by the attacker. One common form of a GNSS spoofing attack, commonly termed a carry-off attack, begins by broadcasting signals synchronized with the genuine GNSS signals observed by the target GNSS receiver. The power of the counterfeit GNSS signals is then gradually increased and drawn away from the genuine GNSS signals.

Spoofing has become a more general concern as low-cost off-the shelf software-defined radio hardware, low-cost GNSS signal simulators, and record-and-play devices, and the like become available for a competent programmer to generate realistic civil GNSS signals. As economic and practical dependences on civil GNSS for transportation, location services, communication, finance, power distribution, and other applications increase, the consequences of GNSS spoofing become more serious. Accordingly, finding effective anti-spoofing measure in GNSS receivers is one of the urgent issues.

BRIEF DESCRIPTION OF THE INVENTION

The embodiments of the present invention provide a method for detecting and eliminating a GNSS spoofing signal with PVT solutions. The method includes (a) acquiring a plurality of target GNSS signals from selected GNSS satellites, (b) identifying each of the acquired GNSS signals based on available authentication information for the acquired GNSS signals as authentic, unverified (unauthenticated), or counterfeit, (c) removing the acquired GNSS signals which are identified as counterfeit from tracking and further processing, while continuing tracking and further processing the acquired GNSS signals identified as authentic or unverified (unauthenticated), (d) generating and storing a first list of the GNSS signals identified as authentic, and a second list of candidate GNSS signals which are the acquired GNSS signals identified as unverified (unauthenticated), (e) creating a plurality of sets of the GNSS signals by selecting at least four target GNSS satellites and thereby choosing corresponding at least four GNSS signals from among the first and second lists of the GNSS signals for each set, each set including all of the authentic GNSS signals on the first list, if any, and at least one unverified (unauthenticated) candidate GNSS signal from the second list (f) calculating position, velocity, and time (PVT) solutions and post-fit residuals for each of the plurality of sets based on the GNSS signals therein, thereby obtaining a plurality of estimated solutions corresponding to the plurality of sets, (g) estimating authenticity of each of the unverified (unauthenticated) GNSS signals included in each set by analyzing the plurality of estimated solutions obtained from the respective sets including the corresponding unverified signals, (h) estimating authenticity and accuracy of each of the estimated solutions based on the estimated authenticity of the at least one unverified (unauthenticated) GNSS signal in the corresponding set from which the PVT solutions and post-fit residual are calculated, and (i) generating and outputting a list of all of the acquired GNSS signals with the respective authenticity thereof, and a list of all possible PVT solutions with the respective authenticity and accuracy thereof.

The acquiring and tracking the plurality of GNSS signals may includes (a1) determining an area of search for each target GNSS signal from a corresponding GNSS satellite based on assistance information on the corresponding GNSS satellite, (a2) searching in the determined area for the target GNSS signal from the corresponding GNSS satellite, (a3) continuing searching in the area after acquiring a first candidate GNSS signal for the target GNSS signal until the entire area is searched, whereby acquiring any additional candidate GNSS signals for the target GNSS signal, and (a4) tracking the acquired one or more candidate GNSS singles for each of the plurality of target GNSS signals from the selected GNSS satellites.

In accordance with one embodiment of the present invention, at least one target GNSS signal among the plurality of target GNSS signals may have a plurality of unauthenticated candidate GNSS signals acquired by searching the area determined for that target GNSS signal. When the plurality of sets of the GNSS signals are created by selecting at least four GNSS signals from among the first and second lists of the GNSS signals, as described above, the plurality of unauthenticated candidate GNSS signals for the same target GNSS signal are distributed among a corresponding plurality of sets, such that each set includes only one candidate GNSS signal per target GNSS signal.

In accordance with another embodiment of the invention, a method detects and eliminates a GNSS spoofing signal with PVT solutions. The method includes (a) acquiring and tracking a plurality of candidate GNSS signal for a plurality of target GNSS signals from selected GNSS satellites. An area of search is determined for each of the plurality of target GNSS signals based on assistance information on the corresponding GNSS satellite, so as to search in the determined area for each target GNSS signal. The search is continued in the area after acquiring a first candidate GNSS signal for the target GNSS signal until the entire area is searched, whereby acquiring any additional candidate GNSS signals for the target GNSS signal, and tracking the acquired one or more candidate GNSS signals for each of the plurality of target GNSS signals. The method further includes (b) identifying each of the candidate GNSS signals of each of the target GNSS signals as authentic, unauthenticated, or counterfeit, based on available authentication information for the target GNSS signal, and (c) removing the candidate GNSS signals identified as counterfeit from tracking and further processing, while continuing tracking and further processing the candidate GNSS signals identified as authentic or unauthenticated, (d) generating and storing a first list containing authentic target GNSS signals each of which is the candidate GNSS signal thereof identified as authentic, and a second list containing the candidate GNSS signals for remaining target GNSS signals, each of the remaining target GNSS signals being an unauthenticated target GNSS signal having one or more candidate GNSS signals identified as unauthenticated, and (e) creating a plurality of sets of GNSS signals each having at least four GNSS signals selected from the first list and the second list, such that each set includes: all of the authentic target GNSS signals on the first list, if any, and a remaining number of the candidate GNSS signals selected from the second list such that the authentic target GNSS signals and the candidate GNSS signals make up the at least four GNSS signals, the candidate GNSS signals being selected such that the set includes only one candidate GNSS signal per target GNSS signal. The method further includes (f) calculating position, velocity, and time (PVT) solutions and post-fit residuals for each of the plurality of sets based on the GNSS signals therein, thereby obtaining a plurality of estimated solutions corresponding to the plurality of sets, (g) analyzing the plurality of estimated solutions, thereby estimating authenticity and accuracy of each of the plurality of estimated solutions, (h) estimating authenticity of the respective candidate GNSS signals of the target GNSS signals based on the estimated authenticity and accuracy of the plurality of estimated solutions, and (i) generating and outputting a list of all of the candidate GNSS signals with the respective estimated authenticity thereof, and a list of all possible PVT solutions with the respective authenticity and accuracy thereof.

The area of search may include a time delay search range and a frequency search range.

In accordance with one embodiment of the present invention, the selected GNSS satellites may include satellites from different GNSS's. The GNSS signals may include GNSS signals in different frequency bands.

The authentication information may include a security code included in the acquired candidate GNSS signal, and information for verifying authenticity of the acquired candidate GNSS signal for the corresponding target GNSS signal.

The calculation of the PVT solutions may include obtaining positional information from at least one sensor. The at least one sensor may include at least one of an optical sensor and an inertial sensor, and the positional information may include a trajectory of a GNSS receiver.

The GNSS receive may output the PVT solutions having the highest authenticity and accuracy as a GNSS receiver output.

An acquired GNS signal may be identified as unauthenticated if no authentication information is available for the acquired GNSS signal.

In accordance with one embodiment of the present invention, the method of detecting and eliminating a GNSS spoofing signal with PVT solutions may be implemented in a non-transitory computer-readable storage medium with an executable program stored thereon, wherein the program instructs a microprocessor to perform the above-described method.

In accordance with one embodiment of the present invention, the above-mentioned method may be implemented in a GNSS receiver configured to perform the corresponding functions and processes steps.

BRIEF DESCRIPTION OF THE DRAWINGS

The present invention is illustrated by way of example, and not by way of limitation, in the FIGS. of the accompanying drawings and in which like reference numerals refer to similar elements and in which.

DETAILED DESCRIPTION OF EMBODIMENTS OF THE INVENTION

The present invention provides detection and elimination of GNSS spoofing signals in GNSS receivers with estimated PVT solutions. The invention protects such GNSS receivers against spoofing attacks.

Figure 1:
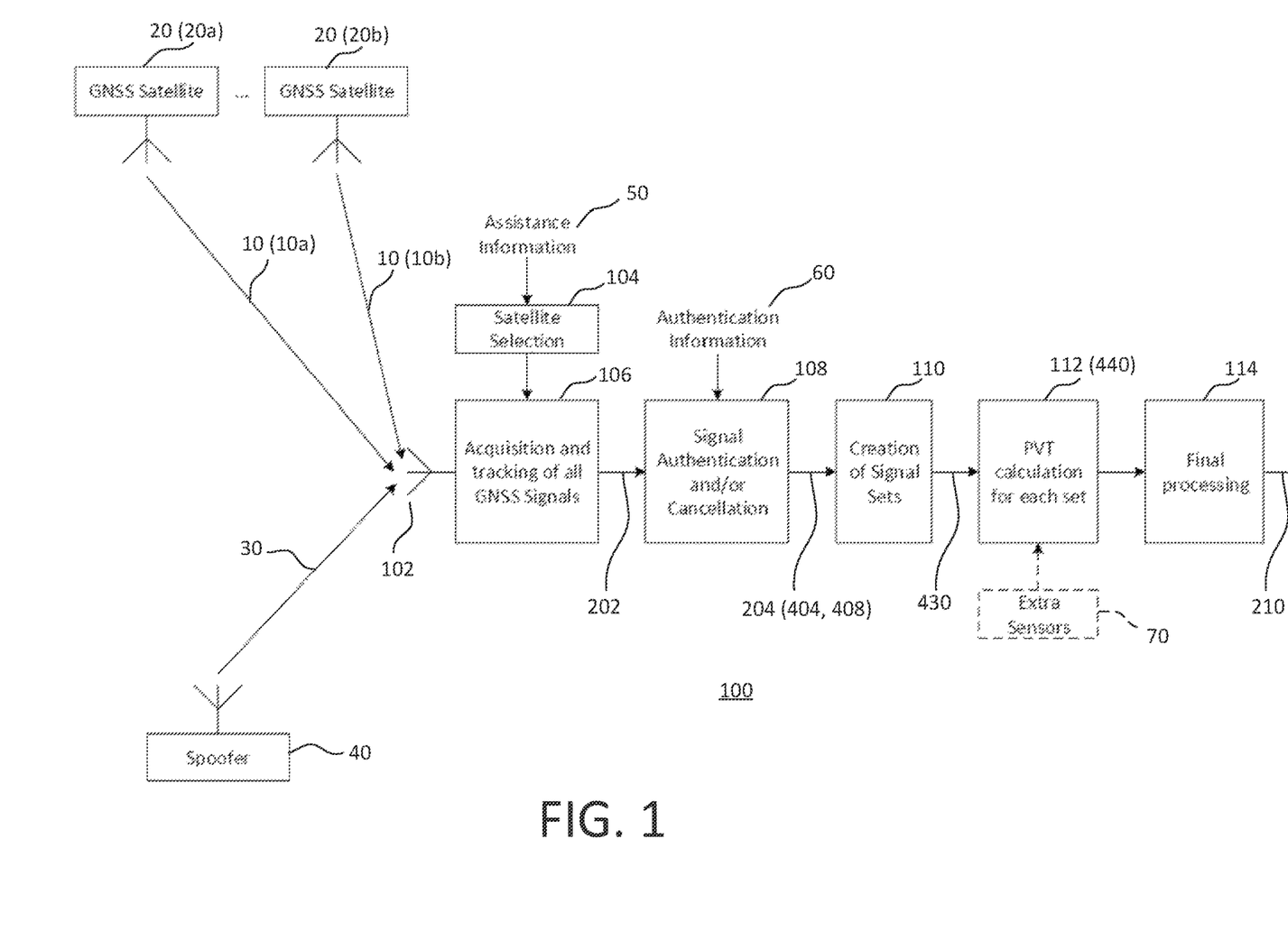
FIG. 1 is a block diagram schematically illustrating a method for detecting and eliminating GNSS spoofing signals and obtaining PVT solutions in accordance with one embodiment of the present invention.

FIG. 1 is a block diagram schematically illustrating a method for detecting and eliminating GNSS spoofing signals and obtaining PVT solutions in accordance with one embodiment of the present invention. The method may be implemented in a GNSS receiver 100 for a navigation device and the like. Functional blocks in FIG. 1 also correspond to schematic structure of the GNSS receiver 100. The GNSS receiver 100 implementing the present invention may be configured as a computer including a CPU, a memory (RAM, ROM), and the like therein so as to have the illustrated functional blocks. These functional blocks may be realized by means of software/computer programs realizing the respective functions, but a part or the whole of them may be realized by hardware.

The GNSS receiver 100 receives GNSS signals 10 (10a, 10b . . . ) from a plurality of GNSS satellites 20 (20a, 20b . . . ) at an antenna 102 thereof. The GNSS receiver 100 also receives a counterfeit signal (GNSS spoofing signal) 30 from a spoofer device 40.

Figure 2:
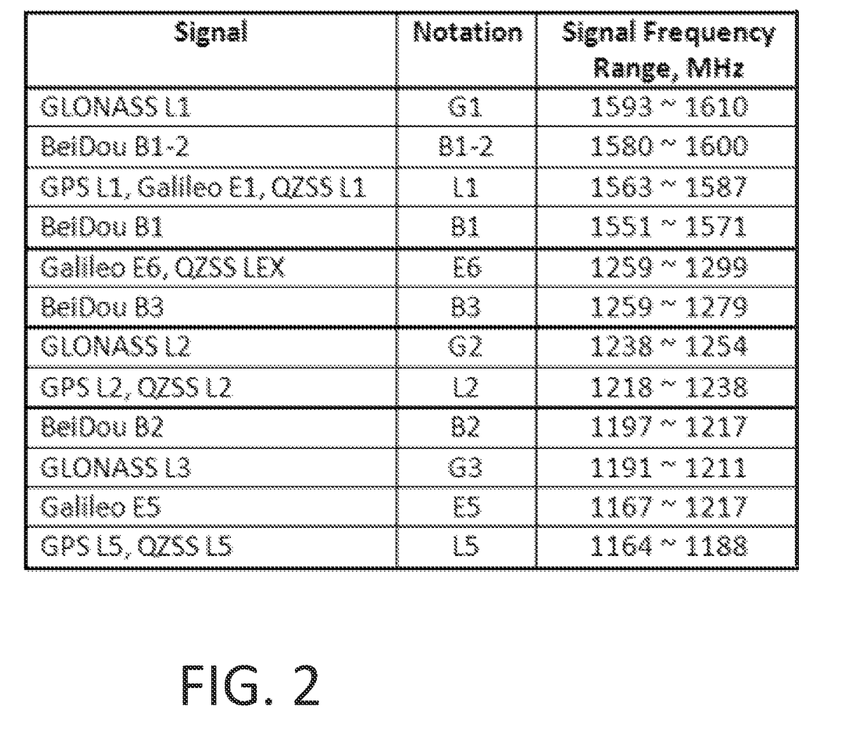
FIG. 2 is a table showing examples of currently available GNSS signals from different GNSS systems (GPS, GLONASS, Galileo, BeiDou, and QZSS) and their frequency ranges.

FIG. 2 shows examples of currently available GNSS signals from different GNSS systems (GPS, GLONASS, Galileo, BeiDou, and QZSS) and their frequency ranges. Each GNSS has three or more frequency bands. The GNSS receiver 100 may obtain assistance information 50 regarding the currently available GNSS satellites, such as the GNSS satellites which are potentially visible from the GNSS receiver's approximate position and time (the antenna's position). Such assistance information may be stored in a memory of the GNSS receiver 100 or obtained through a connection link such as the Internet or radio communication. The assistance information 50 may be transmitted from a base station (server) to the GNSS receiver 100 (client receiver unit). The assistance information 50 may include frequency and timing information of the GNSS signal, the sequence of navigation data bits from each GNSS satellite, ephemeris information for determining the positions of the GNSS satellites, and the like.

Based on available assistance information 50, a plurality of GNSS satellites are selected for acquisition and tracking (104). For example, all GNSS satellites which are potentially visible from the antenna 102 (antenna position) of the GNSS receiver 100 may be selected.

All of the available GNSS signals 10 from the selected GNSS satellites 20 that the GNSS receiver 100 can receive may be received for acquisition and tracking (106). The selected GNSS satellites 20 may include a plurality of satellites from different GNSSs, for example, GPS, GLONASS, Galileo, QZSS, etc. The selected GNSS satellites 20 may be a plurality of satellites from the same GNSS, for example GPS. The plurality of GNSS signals 10 may include GNSS signals in different frequency bands, or may be in the same frequency band, depending on the receiving bandwidth of GNSS receiver 100. The GNSS signals 10, which are used for tracking, may be pre-processed by filters with a different bandwidth in order to reduce processing complexity.

Figure 3:
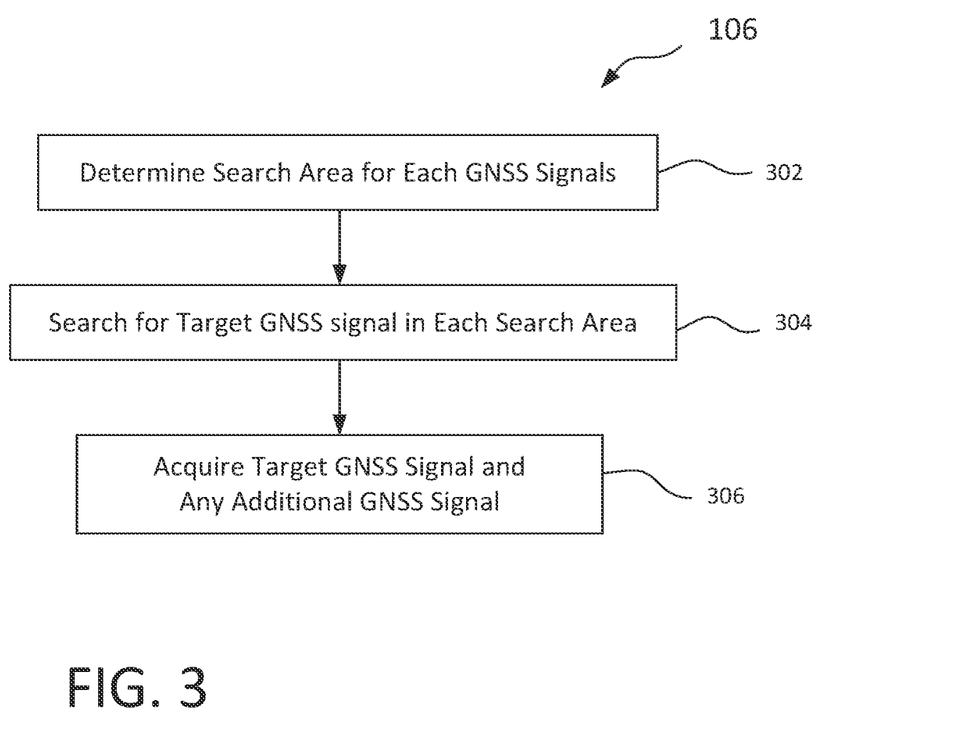
FIG. 3 is a flow chart showing details of the acquisition and tracking process in accordance with one embodiment of the present invention.

FIG. 3 shows details of the acquisition and tracking process 106. As shown in FIG. 3, an area of search for each GNSS signal 10 is determined (302) based on the information on the corresponding GNSS satellite and its GNSS signals, for example, obtained from the assistance information 50. The search area may be defined in the frequency-delay dimension. The frequency range to be searched for the acquisition may be determined from preciseness of the frequency information of the GNSS signal 10, frequency uncertainty in a local oscillator of the GNSS receiver 100, and any other frequency-related errors and uncertainties. The time-delay range to be searched for the acquisition may also be determined from preciseness of the timing information of the GNSS signal 10, time-delay uncertainty on the side of GNSS receiver 100, and any other time-related errors and uncertainties. The frequency search range and the time-delay search range may define the respective search area for each GNSS signal 10 (a target GNSS signal) from the corresponding GNSS satellite (a target GNSS satellite).

Each search area is searched for acquiring the corresponding target GNSS signal (304) from the target GNSS satellite. The search is continued even after the target GNSS signal is acquired until the entire area is searched. That is, the search is continued after acquiring a first candidate GNSS signal for the target GNSS signal until the entire area is searched, such that any additional candidate GNSS signals corresponding to the target GNSS signal are also acquired. This is because the spoofer device 40 may transmit a disguised GNSS signal(s) to the GNSS receiver 100, as mentioned above. The acquired GNSS signals, including the first candidate GNSS signal for the target GNSS signal and any additional candidate GNSS signal(s) for the target GNSS signal from each of the selected GNSS satellites are tracked (306). In addition, only the GNSS signals having energy that is not less than a predetermined threshold may be selected for further tracking.

Returning to FIG. 1, each of the acquired GNSS signals 202 are authenticated based on available authentication information 60 for the acquired GNSS signals (108), so as to identify each of the acquired GNSS signals as authentic (verified), unverified (questionable)/unauthenticated, or counterfeit/spoofing. For example, one or more of the acquired GNSS signals 202 may be a security-enhanced GNSS signal that includes a security code therein. Such a security code may be fully encrypted or contains periodic authentication codes such that some or all of its symbols are unpredictable to a would-be spoofer. By obtaining the security code from another link as the authentication information 60, the acquired GNSS signals 202 can be verified by correlating with the security code sequence. Such a security code may be preliminary obtained as a digital key, or transmitted in real time by a communication link and the like. Any other authentication information may also be used for the authentication process 108.

Figure 4:
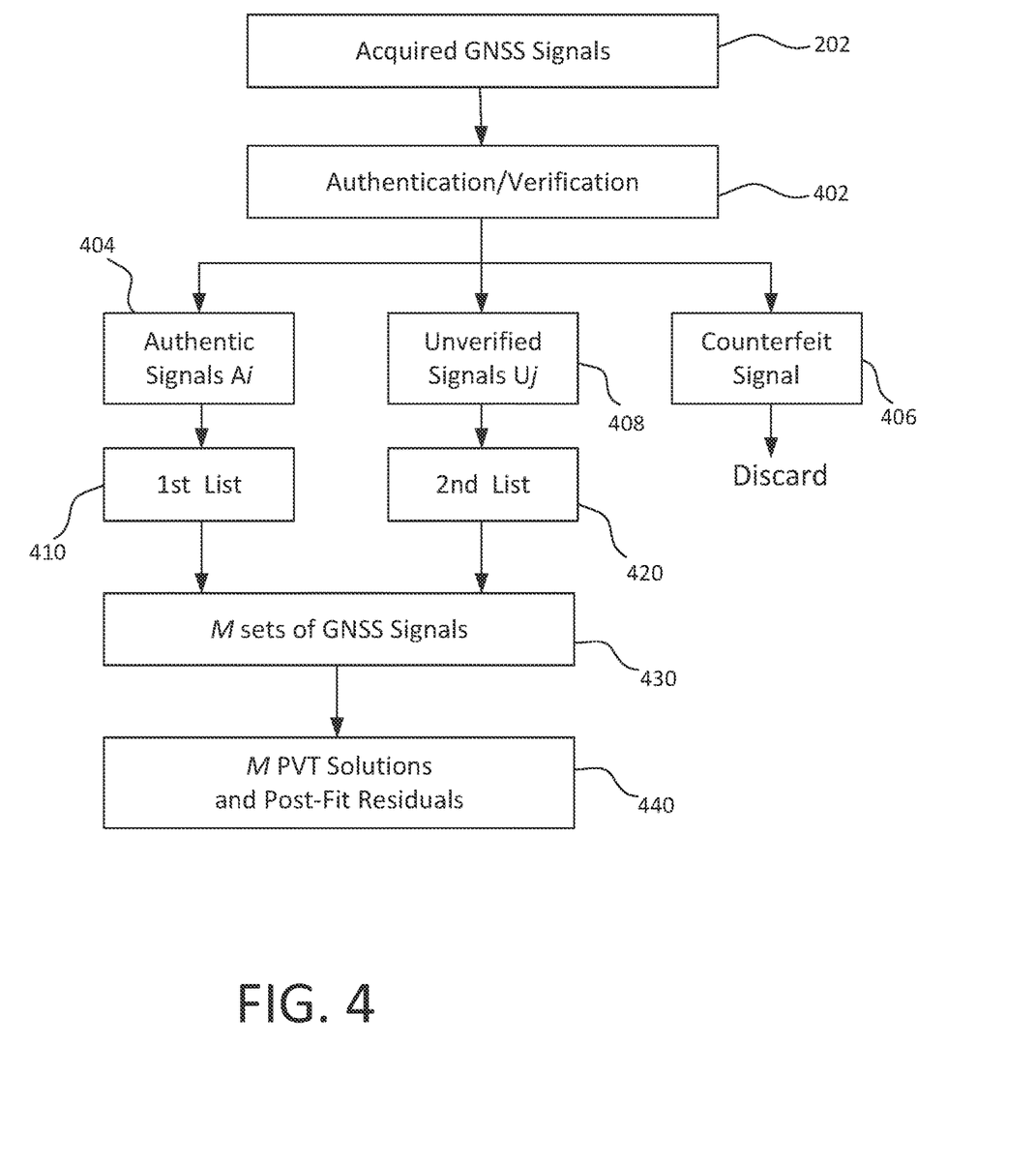
FIG. 4 is a diagram schematically illustrating details of the signal authentication and/or cancelation process and the creation of the list and a plurality of sets of the acquired GNSS signals in accordance with one embodiment of the present invention.

FIG. 4 illustrates more details of the signal authentication and/or cancelation (108), the creation of signal sets (110), and the PVT calculation of each set (112) in FIG. 1. As shown in FIG. 4, the acquired candidate GNSS signals 202 undergo the authentication/verification process 402. The verified GNSS signals are identified and labeled (flagged) as "authentic" signal (404), and the GNSS signals which failed such verification/authentication are labeled (flagged) as "counterfeit" or "spoofing" (406). For example, if an authentic signal for the target GNSS signal has been found in the search area, any other GNSS signal(s) acquired in the same search area would be a counterfeit signal of the target GNSS signal. If an acquired GNSS signal fails the corresponding verification or authentication process, such a GNSS signal is also determined to be as counterfeit. The acquired GNSS signals for which no authentication information is available or no authentication process is performed are labeled (flagged) as "unverified" or "unauthenticated" (408). The GNSS signals, which are determined as counterfeit or spoofing signals, are discarded or eliminated from further processing, for example, by stopping tracking of the counterfeit signals.

As a result of the authentication and/or cancelation process, two lists are generated from the flagged GNSS signals 404 and 408: a first list 410 of the authentic GNSS signals Ai and a second list 420 of unverified or unauthenticated GNSS signals Uj. The generated lists 410 and 420 may be stored in a memory (not shown) of the GNSS receiver 100 and further processing is performed on the listed authentic and unverified GNSS signals.

Referring back to FIG. 1, a plurality of sets of the GNSS signals are created (110) by selecting at least four (4) target GNSS satellites, thereby choosing corresponding at least four (4) GNSS signals from among the first and second lists of the GNSS signals 204 (404, 406), such that each set includes all of the GNSS signals on the first list 410 (i.e., all of the authentic GNSS signals Ai) and at least one unauthenticated candidate GNSS signal from the second list 420 (i.e., at least one unverified/unauthentic candidate GNSS signal Uj).

For example, if there are four or more authentic GNSS signals Ai, it is possible to create a first set including only the authentic GNSS signals so as to calculate authentic navigation solutions for position, velocity, and time (PVT). In such a case, the first set of authentic GNSS signals Ai may produce the most reliable PVT solutions, and thus other sets of candidate GNSS signals may not be necessary to obtain the PVT solutions. However, for the purpose of detecting any possible spoofing signal(s), other sets of GNSS signals may be created and the PVT solutions may be calculated in a similar manner as that described below.

If the number of the authentic target GNSS signals Ai is three or less and the remaining target GNSS signals are all unverified (questionable) or unauthenticated signals Un (n=1, 2, . . . , N), a plurality of sets 430 are created (112 in FIG. 1), and the PVT solutions and post-fit residuals 440 are calculated for each set (114 in FIG. 1).

In the case where there are two authentic GNSS signals A1 and A2, and m unverified target GNSS signals U1, U2 . . . Um have been acquired and tracked, it is possible to create $mC2=m(m-1)/2$ sets of the acquired target GNSS signals where each set includes the two authentic signals A1 and A2, and two unverified signals Uj and Uk (j=1, 2, . . . m, k=1, 2, . . . m, j<k). In order for the full analysis, the PVT solutions and post-fit residuals are calculated for each of the $m(m-1)/2$ sets of the target GNSS signals to produce, for example, $m(m-1)/2$ estimated positions of the GNSS receiver 100 and the post-fit residuals.

The number of sets M is not necessarily $m(m-1)/2$, but may be reduced, if the number in is large and/or if it can be assumed that the number of spoofing signal is one (1). For example, only in sets of target GNSS signals may be created such that each set includes authentic GNSS signals A1 and A2, and unverified GNSS signals Uj and Uk (j=1, 2, . . . m, k=1, 2, . . . m, k=j+1 where j<m, k=1 where j=m). If unverified target GNSS signal Us is the spoofing signal, two sets including Us (when j=s and j+1=s) would produce PVT solutions greatly deviated compared with other PVT solutions. Any statistical threshold value(s) can be used for the determination of spoofing signal. Any other statistical method can be used to estimate and evaluate authenticity of unverified target GNSS singles from the calculated PVT solutions.

In the case where there is only one authentic target GNSS signal A1, and m unverified target GNSS signals U1, U2 . . . Um have been acquired and tracked, it is possible to create $mC3=m(m-1)(m-2)/6$ sets of the acquired target GNSS signals where each set includes the authentic signal A1 and three unverified signals Uj, Uk, and Ul (j=1, 2, . . . m, k=1, 2, . . . m, l=1, 2, . . . m j<k<l). In order for the full analysis, the PVT solutions and post-fit residuals are calculated for each of the $m(m-1)(m-2)/6$ sets of the target GNSS signals to produce, for example, $M=m(m-1)(m-2)/6$ estimated positions of the GNSS receiver 100 and the post-fit residuals. However, the number of the sets M, i.e., the number of the estimated PVT solutions, may be reduced in a similar manner as above, or using any statistical method or scheme. In addition, the number of the acquired GNSS signals in the set is not limited to four, and the similar statistical measure when each set includes five or more acquired GNSS signals.

It should be noted that when the target GNSS signal has a plurality of candidate signals acquired by the search, each set should be created such that the set only includes one candidate signal for the same target GNSS signal. That is, the set includes only one candidate signal per target GNSS signal. Such a plurality of candidate GNSS signals are explained below in more detail.

For example, suppose each set is composed of four (4) target GNSS signals for simplicity. If three authentic GNSS signals A1, A2, and A3 have been acquired for three target GNSS signals and there are remaining N unverified/unauthenticated target GNSS signals Un=U1, U2 . . . $U_N$, each of which may have one or more unauthenticated candidate GNSS signals S(n, j), where n=1, 2, . . . N, j=1, 2, . . . $m_n$, which have been acquired and tracked. A plurality of sets of the acquired GNSS signals may be created such that each set includes the three authentic GNSS signals A1, A2, and A3, and one of the unverified/unauthenticated candidate GNSS signals S(n, j) of the target GNSS signal Un (n=1, 2, . . . N) as the remaining fourth target GNSS signal. If each unverified target GNSS signal Un has only one candidate GNSS signal S(n, 1), N sets of four GNSS signals may be created, and the calculated PVT solutions (with post-fit residuals) may converge to the correct position of the GNSS receiver with reasonable/expected statistical variations (ordinary errors and environmental interferences such as multi path effects) among the unverified target signals Un, if the unverified target signals Un are genuine signals.

However, if spoofing is ongoing, at least one of the unverified target GNSS signals U1, U2 . . . $U_N$ may have more than one candidate GNSS signals S(n, j), where n=1, 2, . . . N, j=1, 2, . . . $m_n$. Suppose an acquired, unverified target GNSS signal U1 has $m_1$ unauthenticated candidate GNSS signals S(1, j), where j=1, 2, . . . $m_1$, and another acquired, unverified target GNSS signal U2 has $m_2$ unauthenticated candidate GNSS signals S(2, k), where k=1, 2, . . . $m_2$. Then, the total of $(m_1+m_2)$ sets of GNSS signals may be created using these two unverified target GNSS signals U1 and U2. In general, if each set includes only one unverified target GNSS signal Un (one of the candidate signals thereof) and the remaining GNSS signals in the set are all authentic GNSS signals Ai, the possible (maximum) number of the sets will be the total sum of the candidate GNSS signals of all unverified target GNSS signals: $M=m_1+m_2+m_3+\ldots+m_N$.

Since any set should not include more than one candidate GNSS signals of the same target GNSS signal, a set of target GNSS signals may have a plurality of "subsets" of candidate GNSS signals if at least one target GNSS signal therein has a plurality of unverified candidate signals. That is, a plurality of subsets (candidate GNSS signal sets) exist for the same target GNSS signal set. In the following explanation, a "set" means a "target GNSS signal set" and a "subset" means a "candidate GNSS signal set" which includes one (and only one) of the candidate GNSS signals for at least one of the target GNSS signals of the target GNSS signal set.

The PVT solutions and post-fit residuals are calculated for each of the M sets of the GNSS signals. For example, M estimated positions of the GNSS receiver 100 may be obtained from the calculated PVT solutions and the post-fit residuals. By analyzing the M estimated positions, for example, by plotting the estimated positions on the coordinate plane or the easting-northing plane, it may found that one or more positions are deviated more than a statistically expected value, indicating that the corresponding set(s) may include a spoofing GNSS signal. It should be noted that M is the total number of the GNSS signal sets for which PVT solutions are to be calculated, and it depends on the number of the authentic GNSS signals, the number of the unauthenticated GNSS signals, and the number of the candidate GNSS signals.

In the case where there are two authentic GNSS signals A1 and A2, and two unauthenticated target GNSS signals U1 and U2 (with multiple candidates GNSS signals) have been acquired and tracked. Suppose a first unauthenticated target signal U1 has $m_1$ unverified candidate GNSS signals $S(1, j)$, where $j=1, 2, \ldots m_1$, and a second unauthenticated target GNSS signal U2 has $m_2$ unverified candidate GNSS signals $S(2, k)$, where $k=1, 2, \ldots m_2$. Then, it is possible to create total of $m_1 \times m_2$ subsets of the acquired GNSS signals, where each subset includes the two authentic GNSS signals A1 and A2, and respective one of unverified/unauthenticated candidate GNSS signals $S(1, j)$ and $S(1, k)$ ($j=1, 2, \ldots m_1$, $k=1, 2, \ldots m_2$). In order for the full analysis, the PVT solutions and post-fit residuals are calculated for each of the $m_1 \times m_2$ subsets of the GNSS signals to produce $M = m_1 \times m_2$ estimated positions of the GNSS receiver 100 and the post-fit residuals. The M estimated positions are analyzed to determine which candidate GNSS signals are genuine signals for the corresponding target GNSS signals as mentioned above.

In another example, suppose there are two authentic GNSS signals A1 and A2, and N unverified/unauthenticated target GNSS signals U1, U2 ... $U_N$ have been acquired and tracked. Then, it is possible to create $NC2 = N(N-1)/2$ sets of the acquired target GNSS signals where each set includes the two authentic signals A1 and A2, and two unverified target signals Up and Uq ($p, q=1, 2, \ldots N, p<q$). In each set, if Up and/or Uq have a plurality of candidate GNSS signals $S(p, j)$ and/or $S(q, k)$, each set has a plurality of subsets depending on the number of the candidate GNSS signals ($m_p$ and/or $m_q$, for example) for the corresponding target GNSS signals as described above. Thus, the possible number of the sets of the GNSS signals is the sum of all of the subsets for each of the $N(N-1)/2$ sets of the target GNSS signals. In order for the full analysis, the PVT solutions and post-fit residuals may be calculated for the sum of the all subsets of the $N(N-1)/2$ sets of the target GNSS signals to produce a plurality of estimated positions of the GNSS receiver 100 and the post-fit residuals.

The number of subsets to be used for calculation is not necessarily the total number of all of the subsets of all of the target GNSS signal sets, but may be reduced, if the number N is large, using certain criteria or threshold values. In this example, each set may include authentic GNSS signals A1 and A2, and candidate GNSS signals $S(p, j)$ and $S(q, k)$ for the unverified target GNSS signals Up and Uq ($p, q=1, 2, \ldots N, q=p+1$ where $p<N$, $q=1$ where $p=N$), where subsets are created for each of the candidate signals $S(p, j)$ and $S(q, k)$, as mentioned above. If unverified candidate GNSS signal $S(r, j_r)$ is the spoofing signal, the subsets including $S(r, j_r)$ (when $p=r$ or $q=p+1=r$, and $j=j_r$ in the combination of Up and Uq) would produce PVT solutions greatly deviated compared with other PVT solutions. Any statistical threshold value(s) can be used for the determination of spoofing signal. Any other statistical method can be used to estimate and evaluate authenticity of unverified GNSS singles from the calculated PVT solutions.

In a case where there is only one authentic GNSS signal A1, and N unverified/unauthenticated target GNSS signals U1, U2 ... $U_N$ (with multiple candidate GNSS signals) have been acquired and tracked, it is possible to create $NC3 = N(N-1)(N-2)/6$ sets for the acquired target GNSS signals such that each set includes the authentic GNSS signal A1 and three unverified/unauthenticated target GNSS signals Up, Uq and Ur ($p, q, r=1, 2, \ldots N, p<q<r$), where each set may have its respective subsets for different candidate GNSS signals $S(p, j)$, $S(q, k)$, $S(r, l)$ for each of the target GNSS signals Up, Uq, and Ur. In order for the full analysis, the PVT solutions and post-fit residuals are calculated for each of the subset of the candidate GNSS signals for each of the $N(N-1)(N_{-2})/6$ sets of the target GNSS signals, to produce a plurality of estimated positions of the GNSS receiver 100 and the post-fit residuals. However, the number of the total subsets for the calculation, i.e., the number of the estimated PVT solutions, may be reduced in a similar manner as above, or using any statistical method or scheme. In addition, the number of the acquired target GNSS signals in the set is not limited to four, and may be five or more. The similar statistical measure may also used when each set includes five or more target GNSS signals.

One embodiment of the present invention may also be applied to such a case in which there is no authentic GNSS signal is identified. A search for a target GNSS signal from a target GNSS satellite is conducted through the entire search area for that target GNSS signal, thereby acquiring one or more candidate GNSS signals for that target GNSS signal. For example, if the target GNSS satellite is a first GNSS satellite (GNSS satellite #1) transmitting a first GNSS signal having a first PRN code (PRN code #1 uniquely assigned to GNSS satellite #1), the frequency/delay search area for the first GNSS signal is known. Under the spoofing situation, a plurality of candidate GNSS signals for the same target GNSS signal may be found (acquired) by searching through the entire frequency/delay search area, as mentioned above. For example, a plurality of candidate GNSS signals having the same PRN code #1 but with different frequencies and/or delays may be found within the frequency/delay search area. Since only one of the plurality of the candidate GNSS signals is the true (authentic) GNSS signal from the GNSS satellite #1, the remaining candidate GNSS signals are considered to be spoofing (counterfeit) signals generated by a spoofer (a spoofing generator) or multi-path signals and the like.

Suppose a plurality of candidate GNSS signals $S(n, i)$ are found for a target GNSS satellite #n, where i is a serial number of the candidate GNSS signals found for the GNSS satellite #n, and $n=1, 2, \ldots, N$, where $N \geq 4$, $i=1, 2, \ldots m_n$, where $m_n$ is the total number of the candidate GNSS signals found for the target GNSS signal from the target GNSS satellite #n. $m_n$ may be one (1) if only one candidate GNSS signal is acquired. For example, if three candidate GNSS signals are found for GNSS satellite #1, (i.e, $m_1=3$) then they are denoted as $S(1,1)$, $S(1, 2)$, and $S(1, 3)$. Similarly, candidate GNSS signals found for GNSS satellite #2 are denoted as $S(2,1)$, $S(2, 2)$, .... Thus, if each set includes four (4) GNSS signals, a plurality $m_1 \times m_2 \times m_3 \times m_4$ of subsets may be created for a target GNSS signal set including target GNSS singles from the GNSS satellites #1, #2, #3, and #4. Such subsets may be created for each combination of four GNSS target signals selected from among the acquired N target GNSS signals.

The genuine GNSS signals received from the GNSS satellites form a set of target GNSS signals consistent to one another (i.e., an internally consistent set of GNSS signals), whose navigation solutions correspond to the true position of the GNSS receiver. For example, if post-fit residuals of the calculate PVT solutions obtained from a set of GNSS signals are small enough, the set of the GNSS signals may be considered as internally consistent. However, a sophisticated spoofer may generate a set of spoofing signals which are also internally consistent, and such a set of spoofing signals may be designed to yield another (wrong) receiver position. In such a case, the acquired candidate GNSS signals may include two (or more) internally consistent sets of target GNSS signals: one set corresponding to the genuine GNSS signals yielding the true position of the GNSS receiver (PVT solutions); and the other set(s) corresponding to spoofing (counterfeit) GNSS signals leading to a false position of the GNSS receiver.

In order to obtain the correct position of the GNSS receiver under such spoofing conditions, the following three tasks may be performed: first, acquiring and tracking all candidate GNSS signals for each target GNSS signal (target GNSS satellite) which have a sufficient level of energy; second, identifying all internally consistent sets (or candidate sets) of the acquired candidate GNSS signals; and third, selecting, from among the candidate sets, a set corresponding to the true GNSS signals and the resulting correct GNSS receiver position (PVT solutions).

By performing the first task, as described above, a plurality of candidate GNSS signals $S(n, i)$ may be obtained for some or all of the target GNSS signals from the respective search area determined for that target GNSS signal. $S(n, i)$ means an i-th candidate GNSS signal for an n-th target GNSS signal from the target GNSS satellite #n, $i=1, 2, \ldots m_n$, where $m_n$ may be one (1) if only one candidate GNSS signal is acquired, as mentioned above. In addition, the number of the candidate GNSS signals $m_n$ may vary by target GNSS signal. However, in any case, only one of the candidate GNSS signals $S(n, i)$ is the genuine GNSS signal $S_g(n, i=g)$, and there is no way to determine which target GNSS signal is the genuine GNSS signal at this stage, without further authentication information. Accordingly, in general, the second task includes the following process steps:

First, one of the candidate GNSS signals $S(n, i_1)$ is selected for each target GNSS signal to create a first set of $N_1$ GNSS candidate signals from among the candidate GNSS signals of N acquired target GNSS signals (i.e., N acquired target GNSS satellites), where $N \geq N_1 \geq 4$, N and $N_1$ are integers, $n=1, 2, \ldots, N$. The number $N_1$ is equal to or greater than 4, and may be equal to or smaller than the total number N of the acquired target GNSS signals. That is, the first set includes the total of $N_1$ candidate GNSS signals with one candidate GNSS signal $S(n, i_1)$ per target GNSS signal, i.e., per target GNSS satellite #n. Using the first set of N candidate GNSS signals (i.e., the measurements thereof), the PVT solutions, including the post-fit residuals, are calculated, and the results (i.e., the PVT solutions and the post-fit residuals) are stored/recorded, for example, in a memory, as estimated solutions $R_1$ for the first set of the candidate GNSS signals.

Similarly, a second set of $N_2$ GNSS candidate signals is created by selecting one of the candidate GNSS signals $S(n, i_2)$ for each target GNSS signal such that the selection of the candidate GNSS signals is different from that of the first set, where $N \geq N_2 \geq 4$, and $N_2$ may be equal to $N_1$ $N_2=N_1$). Using the second set of $N_2$ candidate GNSS signals (i.e., the measurements thereof), the PVT solutions, including the post-fit residuals, are calculated and stored/recorded as estimated solutions $R_2$ for the second set.

Similarly, a third set of $N_3$ GNSS candidate signals is created by selecting one of the candidate GNSS signals $S(n, i_3)$ for each target GNSS signal such that the selection of the candidate GNSS signals is different from that of the first set and the second set, where $N \geq N_3 \geq 4$, and $N_3$ may be equal to $N_1$ and/or $N_2$ (i.e., $N_3=N_2=N_1$, or $N_3=N_2$, or $N_3=N_1$). Using the third set of $N_3$ candidate GNSS signals (measurements), the PVT solutions, including the post-fit residuals, are calculated and stored/recorded as estimated solutions $R_3$ for the third second set. For simplicity, the number of the GNSS signals may be set as $N_3=N_2=N_1=4$.

The process of selecting $N_j$ candidate GNSS signals for the j-th set and calculating the PVT solutions with the post-fit residuals (the estimated solution $R_j$) is repeated until creating all the necessary sets of the candidate GNSS signals. For example, suppose all sets are composed of the same number $N_0$ candidate GNSS signals, for simplicity, and assume a first target GNSS signal (from the GNSS satellite #1) has three acquired candidate GNSS signals $S(1, 1)$, $S(1, 2)$, and $S(1, 3)$, a second target GNSS signal (from the GNSS satellite #2) has two acquired candidate GNSS signals $S(2, 1)$ and $S(2, 2)$, and so on. Then, a first set may include all of first candidate signals $S(1,1)$, $S(2,1)$, $S(3,1) \ldots S(N_0, 1)$ of the $N_0$ target GNSS signals corresponding to the target GNSS satellites #1 through #$N_0$. In the following description, the target GNSS signal from or corresponding to the target GNSS satellite #n may be expressed as the target GNSS signal #n as a short form. The order (first, second, etc.) of the candidate GNSS signals is used to identify each candidate GNSS signals, and may be the order of frequency/wavelength, the order of the intensity/power, the order of the acquisition, or the like. In addition, the $N_0$ target GNSS signals are selected as a combination from among the N target GNSS signals, and thus there may be a number of sets of candidate GNSS signals ("subsets") for each combination of the target GNSS signals (each "set" of target GNSS signals), as discussed above.

A second set may include a second candidate signal $S(1,2)$ for the target GNSS signal #1, and $N_0-1$ first candidate GNSS signals $S(n, 1)$ for the remaining target GNSS signals #2 through #$N_0$. A third set may include a third candidate signal $S(1,3)$ for the target GNSS signal #1 and the same $N_0-1$ first candidate GNSS signals $S(n, 1)$ for the remaining target GNSS signals #2 through #$N_0$. Then, a fourth set may include the first candidate signal $S(1,1)$ for the target GNSS signal #1, a second candidate signal $S(2,2)$ for the target GNSS signal #2, and the $N_0-2$ first candidate GNSS signals $S(n, 1)$ for the remaining target GNSS signals #3 through #$N_0$.

A fifth set may include the second candidate signal $S(1,2)$ for the target GNSS signal #1, the second candidate signal $S(2,2)$ for the target GNSS signal #2, and $N_0-2$ first candidate GNSS signals $S(n, 1)$ for the remaining target GNSS signals #3 through #$N_0$. A sixth set may include the third candidate signal $S(1,3)$ for the target GNSS signal #1, the second candidate signal $S(2,2)$ for the target GNSS signal #2, and the first $N_0-2$ candidate GNSS signals $S(n, 1)$ for the remaining target GNSS signals #3 through #$N_0$. Next, a seventh set may include the first candidate signals $S(1,1)$ and $S(2,1)$ for the target GNSS signals #1 and #2, a second candidate signal $S(3,2)$ for the target GNSS signal #3, and $N_0-3$ first candidate GNSS signals $S(n, 1)$ for the remaining target GNSS signals #4 through #$N_0$. An eighth set may include the second candidate signal $S(1,2)$ for the target GNSS signal #1, the first candidate signal $S(2,1)$ for the target GNSS signal #2, the second candidate signal $S(3,2)$ for the target GNSS signal #3, and the $N_0-3$ first candidate GNSS signals $S(n, 1)$ for the remaining target GNSS signals #4 through #$N_0$, and so on.

In the above example, differences (variations in the navigation solutions and/or the post-fit residuals) among the first to third sets may reflect degrees of authenticity of the candidate GNSS signals S(1,1), S(1,2), and S(1,3) as the remaining candidate GNSS signals are the same, provided that the remaining candidate GNSS signals are sufficiently consistent with each other to render the differences among the sets meaningful. Similarly, differences among the fourth to sixth sets may also reflect degrees of authenticity of the candidate GNSS signals S(1,1), S(1,2), and S(1,3) as the remaining candidate GNSS signals are the same among these three sets, provided that the remaining candidate GNSS signals are sufficiently consistent with each other. On the other hand, a difference between the first and fourth sets, that between the second and fifth sets, and that between the third and sixth sets may respectively reflect a different degree of authenticity between the candidate signals S(2,1) and S(2,2) for the target GNSS signal #2, since the remaining candidate GNSS signals are the same for each pair, provided the remaining candidate GNSS signals are sufficiently consistent with each other.

It should be noted that, as mentioned above, when $N_0<N$, the selection of the $N_0$ target GNSS signals, i.e., the selection of the target GNSS satellites, is not limited to the GNSS satellites #1 through #$N_0$, but any $N_0$ number of GNSS satellites may be chosen as a combination from among the N GNSS satellites so as to make necessary and/or additional sets of the candidate GNSS signals to analyze the degree of authenticity of each candidate GNSS signals.

After calculating the PVT solutions and the post-fit residuals (the estimated solutions R) for all sets, all of the results are analyzed to select the sets which are considered to be internally consistent. For example, the sets having the post-fit residuals of the solution which are small enough may be considered to be internally consistent. The estimated solutions obtained from the sets may be statistically analyzed. For example, the estimated position of the GNSS receiver may be plotted on a two-dimensional plane or three-dimensional space for analysis, and the internally consistent sets would yield the correct position and other false position(s) by converging or gathering on/around the correct position and other false position(s). The number of the internally consistent sets may vary, depending on the number of total (available) target GNSS signals, the number of the GNSS signals in respective sets, the number of the candidate GNSS signals, the number of spoofing signals, and the like.

If spoofing signals are created quite skillfully, determining which position is the true position may require heavy computational load on a processor. In such a case, use of additional authentication information may be helpful.

For example, if it is possible to authenticate at least some of the acquired candidate GNSS signals, then such a pre-authentication will greatly simplifies the second and the third task. First, the number of sets to be created is significantly reduced by eliminating any other candidate GNSS signals for the same target GNSS signal for which the authentic GNSS signal has already been found. Secondly, all of the sets must necessarily include all of the authentic GNSS signals, as discussed above, so the use of false candidate (spoofing) GNSS signals in such sets will lead to a significant increase in the post-fit residuals, which allows such spoofing GNSS signals to be effectively eliminated. Other additional information that allows to reject a false position may be data from inertial and other sensors.

Figure 5A:
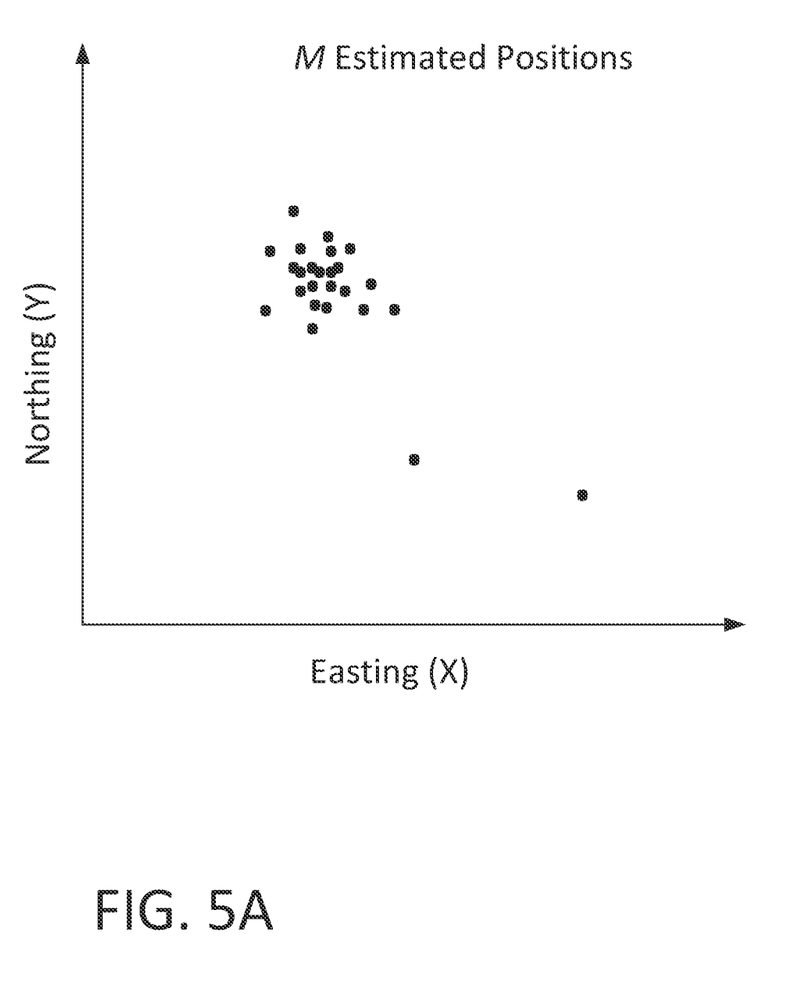
FIG. 5A is a diagram schematically and conceptually illustrates an example of plotting M estimated positions of the GNSS receiver.

FIG. 5A schematically and conceptually illustrates such a plot of M estimated positions of the GNSS receiver. Based on the extent of the deviation compared with a statistical deviation, the authenticity of each unverified GNSS signal Uj may be estimated. Other PVT solutions, i.e., velocity and time may also be calculated, and the authenticity of each unverified GNSS signal Uj may be estimated based on any combination of position, velocity, and/or time.

Figure 5B:
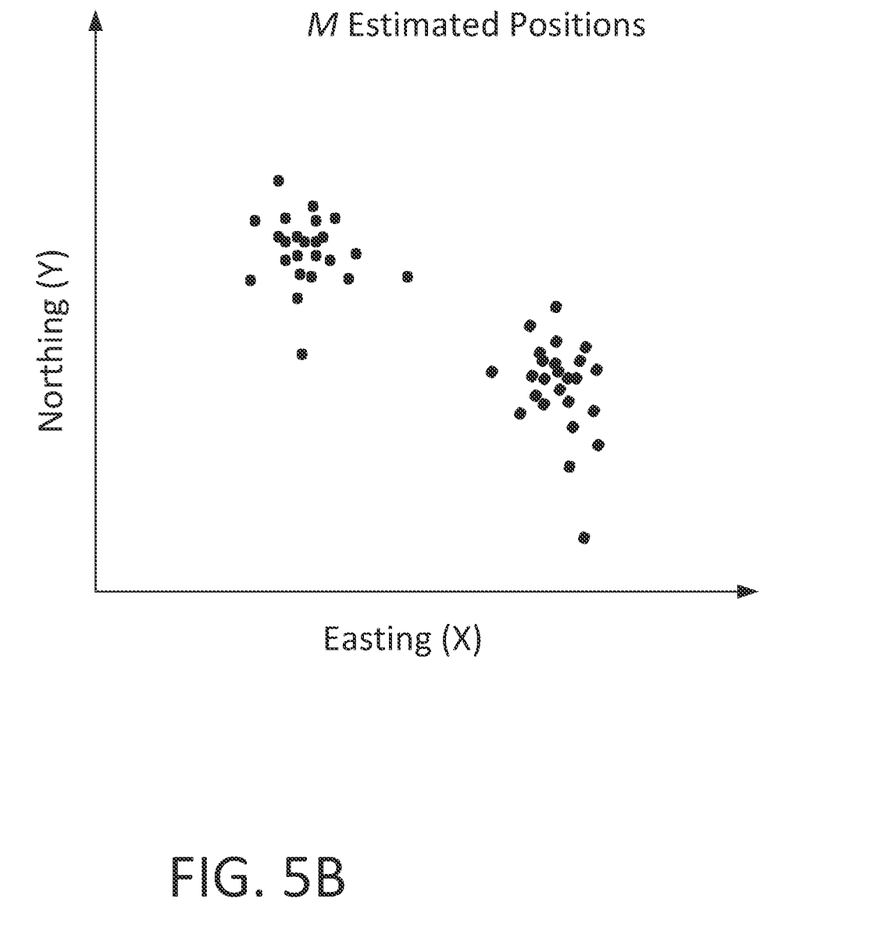
FIG. 5B is a diagram schematically and conceptually illustrates another example of plotting M estimated positions of the GNSS receiver.

FIG. 5B schematically and conceptually illustrates in a case in which a plot of M estimated positions of the GNSS receiver shows two distinct possible GNSS receiver positions. This indicates that acquired GNSS signals include two sets of internally consistent GNSS signals. Since only one GNSS receiver position is the true position, further statistic analysis and/or other external information may be used to identify the true and false GNSS receiver positions.

In addition, as shown in FIG. 1, other information or data from at least one sensor 70 may also used in calculating the PVT solutions and post-fit residuals calculation. For example, when the position (coordinates) of the GNSS receiver is calculated, an optical sensor and/or an inertia sensor may be used to obtain the GNSS receiver's trajectory. In accordance with one embodiment of the present invention, the coordinates and post-fit residuals may be calculated sequentially in time using the Kalman filter. In addition such information may also be used to evaluate the estimated GNSS receiver positions shown in FIG. 5B.

Finally, the authenticity and accuracy of each of the PVT solutions are estimated based on the estimated authenticity of the GNSS signals (114). For example, the following information is outputted: a list of all received GNSS signals; the verified or estimated authenticity of each of the received GNSS signals (with low authenticity indicating possible spoofing attack); a list of all possible PVT solutions; and estimated authenticity and accuracy of each PVT solution.

The PVT solution having the highest authenticity and accuracy may be outputted as a GNSS receiver output 210.

In accordance with one embodiment of the present invention, the method as described above may be implemented in a non-transitory computer-readable storage medium with an executable program stored thereon. The program instructs a microprocessor to perform the method described above.

Figure 6:
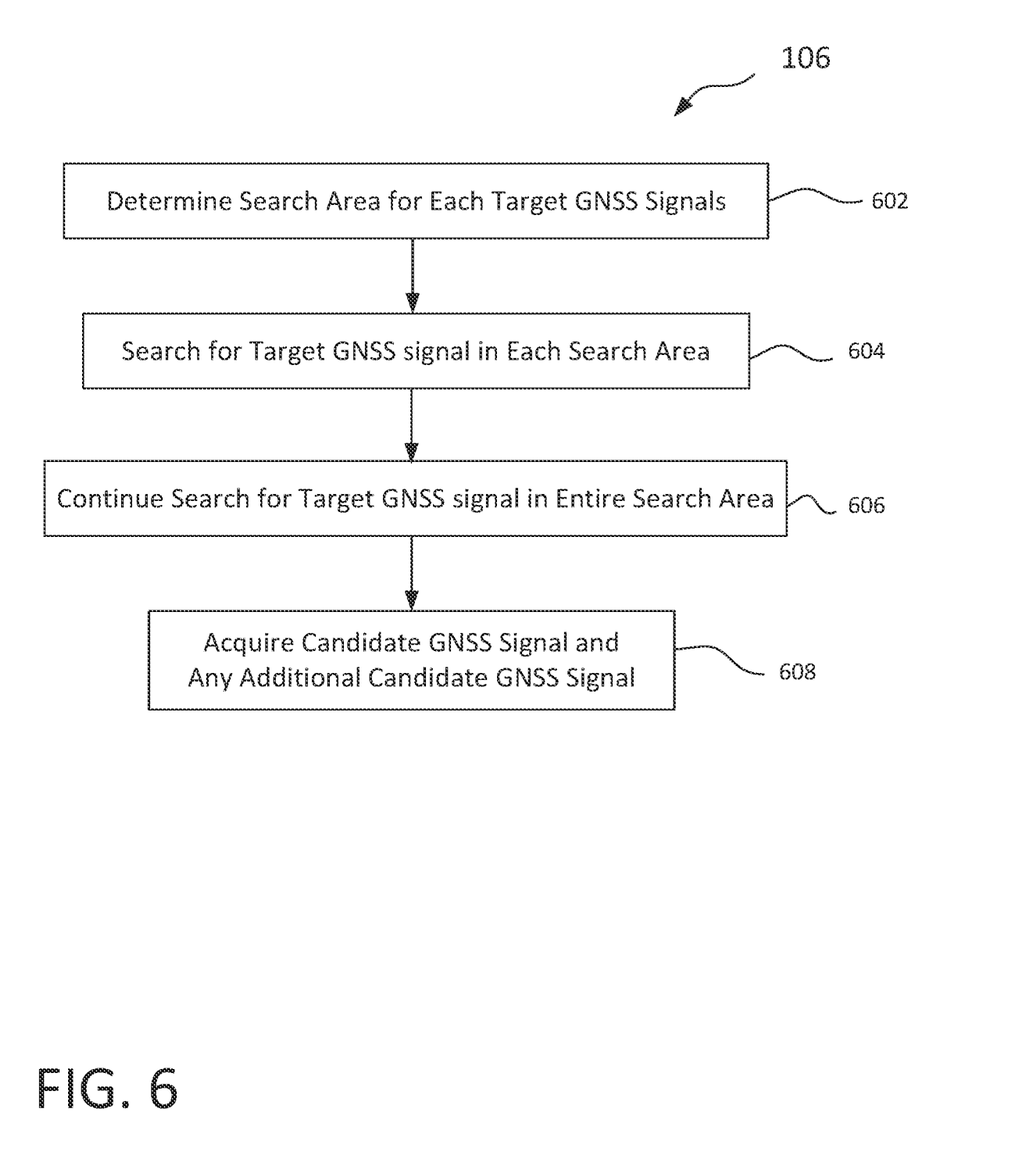
FIG. 6 is a flow chart showing details of the acquisition and tracking process in accordance with another embodiment of the present invention.
Figure 7:
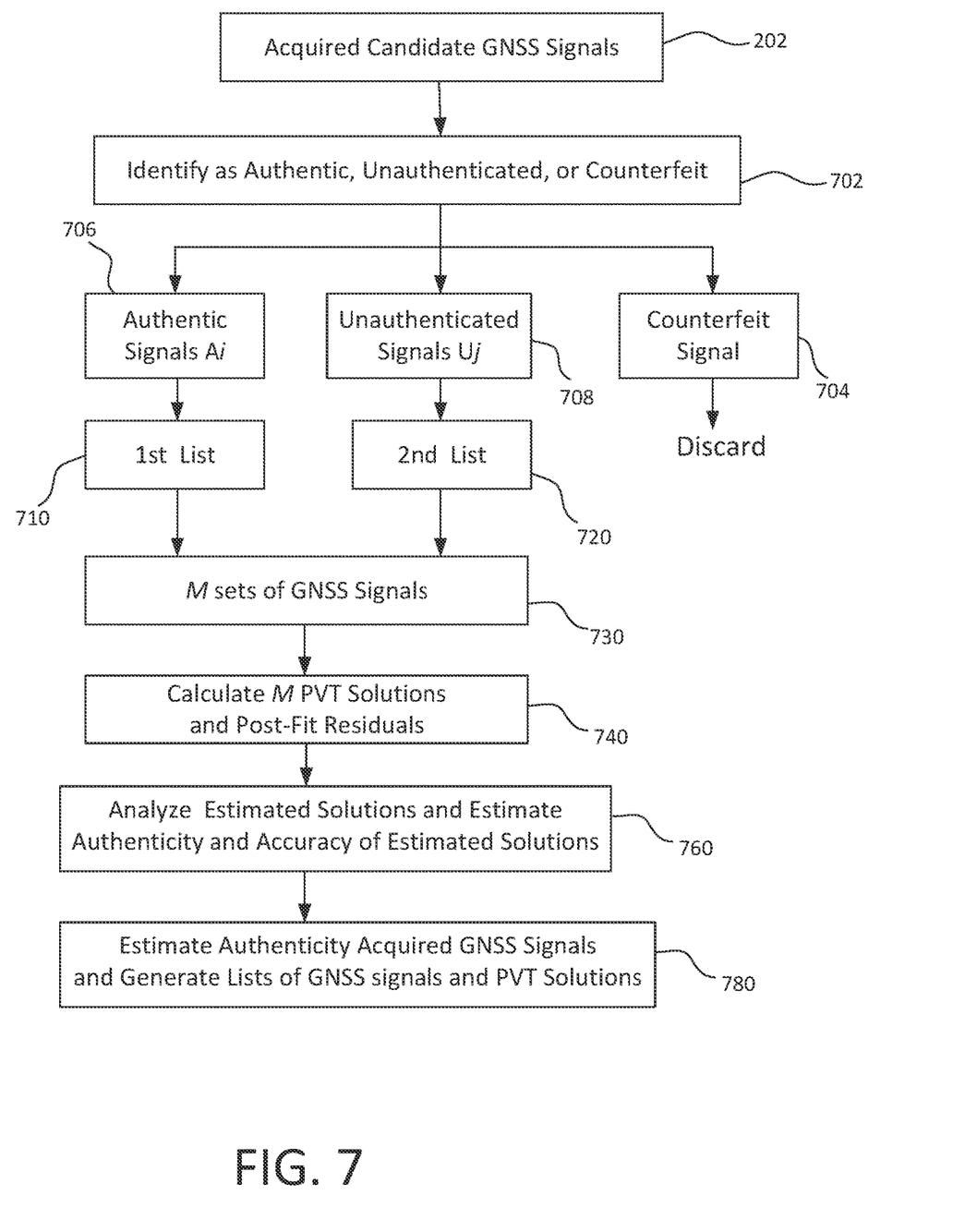
FIG. 7 is a diagram schematically illustrating details of the signal authentication and/or cancelation process and the creation of the lists and a plurality of sets of the acquired GNSS signals in accordance with another embodiment of the present invention.

FIGS. 6 and 7 illustrate a method for detecting and eliminating a GNSS spoofing signal with PVT solutions, in accordance with another embodiment of the present invention, in which a GNSS receiver acquires and tracks a plurality of candidate GNSS signal for a plurality of target GNSS signals from selected GNSS satellites. FIG. 6 shows more details of the signal acquisition and tracking (106) in FIG. 1, and FIG. 7 shows more details of the signal authentication and/or cancelation (108), the creation of signal sets (110), the PVT calculation of each set (112), and the estimation and analysis of the PVT solutions (114) in FIG. 1.

As shown in FIG. 6, the acquisition and tracking of the plurality of candidate GNSS signals (106) includes determining an area of search for each of the plurality of target GNSS signals based on assistance information on the corresponding GNSS satellite (602), and searching in the determined area for each target GNSS signal (604). The search is continued in the area even after acquiring a first candidate GNSS signal for the target GNSS signal until the entire area is searched (606), whereby acquiring any additional candidate GNSS signals for the target GNSS signal (608). The one or more candidate GNSS signals thus acquired for each of the plurality of target GNSS signals are tracked.

As shown in FIG. 7, each of the candidate GNSS signals (202) of each of the target GNSS signals are identified as authentic, unauthenticated, or counterfeit, based on available authentication information for the target GNSS signal (702), The candidate GNSS signals identified as counterfeit are removed from tracking and further processing (704), while the candidate GNSS signals identified as authentic or unauthenticated are tracked for further processing. The authentic GNSS signals are authentic target signals since they are already identified so, and thus this means that there is no other candidate signals for the same target GNSS signal. Unauthenticated GNSS signals include both unauthenticated target GNSS signals with and without other additional candidate GNSS signals.

A first list 710 and a second list 720 are created based on the authentic target GNSS signals 706 and unauthenticated GNSS signals 708. The first list 710 contains the authentic target GNSS signals, each of which is a single candidate GNSS signal identified as authentic, while the second list 720 contains the candidate GNSS signals for the remaining target GNSS signals each of which is an unauthenticated target GNSS signal having one or more candidate GNSS signals identified as unauthenticated. The second list 720 may contain all of the candidate GNSS signals for all of the unauthenticated target GNSS signals in such a manner that one of the candidate GNSS signal is selected "target GNSS signal by target GNSS signal" basis.

A plurality of sets of GNSS signals are created (730) by selecting, for each set, at least four GNSS signals from the first list and the second list, such that each set includes all of the authentic target GNSS signals on the first list, if any, and a remaining number of the candidate GNSS signals selected from the second list. That is, the authentic target GNSS signals and the candidate GNSS signals make up the at least four GNSS signals. It should be noted that the candidate GNSS signals are selected such that each set includes only one candidate GNSS signal per target GNSS signal, as described above in detail.

Position, velocity, and time (PVT) solutions and post-fit residuals are calculated for each of the plurality of sets based on the GNSS signals therein (740), thereby obtaining a plurality (M) of estimated solutions corresponding to the plurality of sets. The plurality of estimated solutions are analyzed, thereby estimating authenticity and accuracy of each of the plurality of estimated solutions (760). Then, authenticity of the respective candidate GNSS signals of the target GNSS signals is estimated based on the estimated authenticity and accuracy of the plurality of estimated solutions (780). A list of all of the candidate GNSS signals with the respective estimated authenticity thereof, and a list of all possible PVT solutions with the respective authenticity and accuracy thereof may be generated and output.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A method for detecting and eliminating a global navigation satellite system (GNSS) spoofing signal with position, velocity, and time (PVT) solutions, the method comprising:

acquiring and tracking a plurality of candidate GNSS signals for a plurality of target GNSS signals from selected GNSS satellites, including:
determining an area of search for each of the plurality of target GNSS signals based on assistance information on the corresponding GNSS satellite;
searching in the determined area for each target GNSS signal;
continuing searching in the area after acquiring a first candidate GNSS signal for the target GNSS signal until the entire area is searched, whereby acquiring any additional candidate GNSS signals for the target GNSS signal; and
tracking the acquired one or more candidate GNSS signals for each of the plurality of target GNSS signals;

identifying each of the candidate GNSS signals of each of the target GNSS signals as authentic, unauthenticated, or counterfeit, based on available authentication information for the target GNSS signal;

removing the candidate GNSS signals identified as counterfeit from tracking and further processing, while continuing tracking and further processing the candidate GNSS signals identified as authentic or unauthenticated;

generating and storing a first list containing authentic target GNSS signals each of which is the candidate GNSS signal thereof identified as authentic, and a second list containing the candidate GNSS signals for remaining target GNSS signals, each of the remaining target GNSS signals being an unauthenticated target GNSS signal having one or more candidate GNSS signals identified as unauthenticated;

creating a plurality of sets of GNSS signals each having at least four GNSS signals selected from the first list and the second list, such that each set includes:
all of the authentic target GNSS signals on the first list, if any; and
a remaining number of the candidate GNSS signals selected from the second list such that the authentic target GNSS signals and the candidate GNSS signals make up the at least four GNSS signals, the candidate GNSS signals being selected such that the set includes only one candidate GNSS signal per target GNSS signal;

calculating position, velocity, and time (PVT) solutions and post-fit residuals for each of the plurality of sets based on the GNSS signals therein, thereby obtaining a plurality of estimated solutions corresponding to the plurality of sets;

analyzing the plurality of estimated solutions, thereby estimating authenticity and accuracy of each of the plurality of estimated solutions;

estimating authenticity of the respective candidate GNSS signals of the target GNSS signals based on the estimated authenticity and accuracy of the plurality of estimated solutions; and generating and outputting a list of all of the candidate GNSS signals with the respective estimated authenticity thereof, and a list of all possible PVT solutions with the respective authenticity and accuracy thereof.

2. The method of claim 1, wherein the area of search includes a time delay search range and a frequency search range.

3. The method of claim 1, wherein the selected GNSS satellites include satellites from different GNSS's.

4. The method of claim 1, wherein the target GNSS signals include GNSS signals in different frequency bands.

5. The method of claim 1, wherein the authentication information includes:
a security code included in the acquired candidate GNSS signal; and information obtained separately from the acquired candidate GNSS signal for the corresponding target GNSS signal.

6. The method of claim 1, wherein the calculating the PVT solutions includes:
obtaining positional information from at least one sensor.

7. The method of claim 6, wherein the at least one sensor includes an optical sensor or an inertial sensor.

8. The method of claim 6, wherein the positional information includes a trajectory of a GNSS receiver.

9. The method of claim 1, further comprising:
outputting the PVT solution having the highest authenticity and accuracy as a GNSS receiver output.

10. The method of claim 1, wherein the candidate GNS signals are identified as unauthenticated if no authentication information is available for the corresponding target GNSS signal.

11. A non-transitory computer-readable storage medium with an executable program stored thereon, wherein the program instructs a microprocessor to perform the method of claim 1.

12. A GNSS receiver configured to perform the method of claim 1.

\* \* \* \* \*